US006468576B1

(12) United States Patent
Sher et al.

(10) Patent No.: US 6,468,576 B1
(45) Date of Patent: Oct. 22, 2002

(54) FROZEN SLUSH LIQUID CONCENTRATE AND METHOD OF MAKING SAME

(75) Inventors: Alexander A. Sher, Danbury; Leann M. Thompson; Simon J. Livings, both of New Milford; Elaine R. Wedral, Sherman, all of CT (US)

(73) Assignee: Nestec S.A., Vevey (CH)

( * ) Notice: Subject to any disclaimer, the term of this patent is extended or adjusted under 35 U.S.C. 154(b) by 302 days.

(21) Appl. No.: 09/599,524

(22) Filed: Jun. 23, 2000

(51) Int. Cl.[7] ................................................ A23G 9/00
(52) U.S. Cl. .................... 426/565; 426/330.3; 426/590; 426/597; 426/599
(58) Field of Search .............................. 426/565, 330.3, 426/393, 399, 590, 597, 599

(56) References Cited

U.S. PATENT DOCUMENTS

| | | | |
|---|---|---|---|
| 2,603,569 A | 7/1952 | Alther et al. .................. 99/78 |
| 3,073,703 A | 1/1963 | Dunn .......................... 99/192 |
| 3,647,472 A | 3/1972 | Speech et al. ................. 99/34 |
| 3,826,829 A | 7/1974 | Marulich .................... 426/190 |
| 3,897,571 A | 7/1975 | Homler et al. .............. 426/327 |
| 3,914,440 A | 10/1975 | Witzig ........................ 426/130 |
| 3,968,266 A | 7/1976 | Baugher ..................... 426/566 |
| 3,987,211 A | 10/1976 | Dunn et al. ................. 426/551 |
| 4,400,405 A | 8/1983 | Morley et al. ............... 426/565 |
| 4,434,186 A * | 2/1984 | Desai et al. ................. 426/565 |
| 4,497,841 A | 2/1985 | Wudel et al. ................ 426/565 |
| 4,542,035 A * | 9/1985 | Huang et al. ................ 426/565 |
| 4,748,033 A * | 5/1988 | Syfert et al. ............. 426/330.3 |
| 4,790,999 A | 12/1988 | Ashmont et al. ........... 426/592 |
| 4,871,554 A * | 10/1989 | Kalala et al. ................. 426/74 |
| 4,986,994 A | 1/1991 | Baccus, Jr. .............. 426/330.3 |
| 5,069,924 A | 12/1991 | Baccus, Jr. .................. 426/590 |
| 5,102,682 A | 4/1992 | Nasrallah et al. ........... 426/590 |
| 5,147,677 A | 9/1992 | Ziegler ....................... 426/614 |
| 5,246,725 A * | 9/1993 | Fisher et al. ................ 426/565 |
| 5,853,785 A | 12/1998 | Nayyar et al. .............. 426/565 |
| 6,261,610 B1 * | 7/2001 | Sher et al. .................... 426/74 |

FOREIGN PATENT DOCUMENTS

| | | |
|---|---|---|
| GB | 1 331 518 | 9/1973 |
| WO | WO 98/41108 | 9/1998 |
| WO | WO 00/30462 | 6/2000 |

OTHER PUBLICATIONS

Knipschildt, M.E., and Andersen, G.G., "Drying of Milk and Milk Products," Chapter 4 in *Modern Dairy Technology, vol. 1: Advances in Milk Processing,* Second Edition, Chapman–Hall, New York, 1986, p. 220.

* cited by examiner

*Primary Examiner*—Nina Bhat
(74) *Attorney, Agent, or Firm*—Winston & Strawn

(57) ABSTRACT

The present invention is directed to a liquid concentrate composition containing emulsifier(s), milk protein(s), freezing point depressant(s), sedimentation stabilizer(s), gelation stabilizer(s), flavoring(s), and water. Optionally, the concentrate may also contain nucleating agent(s) and anti-microbial preservative(s). The present invention is further related to a process for preparing a liquid concentrate of this type, as well as a method for preparing a slush beverage made from the liquid concentrate. Advantageously and unexpectedly, certain combinations of ingredients, their order of addition, and other process parameters can be selected so that the concentrate is more shelf-stable and has more desirable properties and so that the resulting slush beverage tends to have good mouthfeel, a smooth texture, and a pleasant, refreshing taste.

25 Claims, No Drawings

FROZEN SLUSH LIQUID CONCENTRATE AND METHOD OF MAKING SAME

FIELD OF THE INVENTION

The present invention relates to the formation of a shelf-stable liquid concentrate for producing slush beverages and the process of making the same. The present invention also relates to frozen flavored slushes including the liquid concentrates, with improved texture and mouthfeel.

BACKGROUND OF THE INVENTION

The market for frozen beverages as refreshing drinks for dispensing is rapidly growing. The United States is the market leader with respect to this type of product. These consumable products are typically composed of ice crystals distributed throughout a sweetened and flavored aqueous matrix and typically have both a refreshing and cooling effect with a nice appearance.

Commercial equipment has been developed to produce and dispense slush products for consumption at a place of sale. The equipment includes a cooling device and a device for constant agitation, in order to prevent ice agglomeration and in order to avoid complete freezing. Most existing products used in these machines are powder based, although some products now are liquid concentrates, and some auto-feed dispensing equipment is in use.

U.S. Pat. No. 5,853,785 discloses a dry mix for preparing a slush beverage. The mix contains at least 2 percent of a water-soluble, low viscosity hydrocolloid ingredient and preferably contains insoluble particles, for example, calcium silicate, to function as an ice crystal nucleating agent. The dry mix, upon combination with the appropriate amount of water or milk, produces a liquid, which can be frozen into a fine slush consistency within three hours in an average household freezer.

Applicants have determined that some disadvantages of using powder products include: difficulties in dissolution in water as compared to liquid concentrate, the possibility in having a heterogeneous product, and the requirement for manual refill. Further, formation of large size ice crystals, which can have an undesirable impact on the consumer perception of such powdered slushes can be due to the use of powdered precursors.

U.S. Pat. No. 3,826,829 describes a ready-to-drink liquid that can be transformed into a slush beverage by freezing. This liquid includes in the formulation freezing point depressants, such as ethyl alcohol and/or polyols, for example, glycerol, which can be incompatible with products designed for children and/or may impart undesirable flavor to the beverage. These low-molecular weight alcohols also tend to prolong the time needed to obtain a slush.

Applicants have also determined that disadvantages of a ready-to-drink liquid include the need to transport large volumes of the product and involve the use of expensive heat treatment processing, as well as packaging materials, to ensure an aseptic product. It is believed that these expensive processing and packaging techniques are required due to a high water activity.

Thus, there is a need for good shelf-stable, coffee-based liquid concentrates, which can maintain a manageable viscosity for pumping by an industrial auto-feed system, in order to produce frozen beverages for easy dispensing as a refreshing drinks with pleasant mouthfeel.

SUMMARY OF THE INVENTION

The present invention relates to a liquid concentrate including a source of milk protein, present in an amount from about 0.5 wt % to 15 wt %; a sedimentation stabilizer present in an amount sufficient to help prevent and/or inhibit sediment formation or growth without causing gelation in the concentrate; a gelation stabilizer present in an amount sufficient to help prevent and/or inhibit gelation or a significant viscosity increase in the concentrate; a freezing point depressant present in an amount sufficient to reduce the freezing point of the concentrate below 0° C., preferably not less than 1° C., more preferably not less than about 3° C., most preferably to about −10° C. to −3° C.; a sweetener comprising corn syrup and present in an amount sufficient to impart a desirable taste or texture to the concentrate; an emulsifier present in an amount sufficient to help prevent and/or inhibit sediment formation or growth, gelation, or a significant viscosity increase in the concentrate; a flavoring component in an amount sufficient to impart a desirable flavor to the concentrate; and water, in an amount sufficient to form a liquid concentrate.

In a preferred embodiment, the sedimentation stabilizer may be present in an amount from about 0.01 wt % to 0.05 wt %, the gelation stabilizer may be present in an amount from about 0.1 wt % to 5 wt %, the freezing point depressant may be present in an amount from about 0.1 wt % to 23 wt %, the sweetener is corn syrup and may be present in an amount from about 40 wt % to 60 wt %, the emulsifier may be present in an amount from about 0.1 wt % to 5 wt %, and the flavoring component may be present in an amount from about 2 wt % to 16 wt %. Advantageously, the liquid concentrate can possess one or more of shelf-stability for at least six months; a water activity of about 0.85 or less; a pH of about 6.3 or less; a solids content from about 60 wt % to 80 wt %; and a viscosity at room temperature from about 150 cPs to 2000 cPs.

In one embodiment, the sedimentation stabilizer includes kappa-carrageenans, kappa(II)-carrageenans, lambda-carrageenans, iota-carrageenans, carboxylmethylcellulose, microcrystalline cellulose, other cellulosics, or combinations thereof. Preferably, the sedimentation stabilizer includes kappa-carrageenans, kappa(II)-carrageenans, or a combination thereof, which is present in an amount from about 0.01 wt % to 0.03 wt %.

In another embodiment, the gelation stabilizer can include gum arabic, food-grade phosphates, food-grade polyphosphates, or combinations thereof. Preferably the gelation stabilizer includes disodium phosphate, which is present in an amount from about 0.1 wt % to 3 wt %.

In one embodiment, the emulsifier includes monoglycerides, diglycerides, lecithin, or combinations thereof. In a preferred embodiment, the emulsifier includes a mixture of mono- and di- glycerides, preferably in a ratio from about 1:0.05 to 1:0.5.

In another embodiment, the freezing point depressant includes carbohydrates, sucrose, fructose, maltodextrin, oils, or combinations thereof, and can be present preferably in an amount of no more than about 23 wt %.

Preferably, the liquid concentrate contains one or more flavoring compounds having the flavor of chocolate, coffee, mocha, french vanilla, peanut butter, chai, or combinations thereof.

Optionally, the liquid concentrate also contains at least one nucleating agent, preferably selected from calcium carbonate, calcium silicate, titanium dioxide, and mixtures thereof, more preferably calcium carbonate. It is preferable that the at least one nucleating agent be present in an amount sufficient to decrease ice crystal size by at least about 10% by volume, preferably at least about 15% by volume, more preferably at least about 20% by volume. Alternately, the at least one nucleating agent may be present in an amount from about 0.1 wt % to 5 wt %.

Optionally, the liquid concentrate also contains at least one anti-microbial preservative, preferably a sorbate, more preferably potassium sorbate. It is preferable that the at least one anti-microbial preservative be present in an amount sufficient to prevent and/or significantly inhibit microbial stability or growth. Alternately, the at least one anti-microbial agent may be present in an amount from about 0.2 wt % to 0.5 wt %.

The present invention is further directed to a process for preparing a liquid concentrate, which may be similar in composition to any of the liquid concentrates described above. The process includes blending together powder components including a gelation stabilizer and a sedimentation stabilizer to form a first mixture; combining water and the first mixture; mixing in a source of milk protein, an emulsifier, a flavoring component, and a freezing point depressant; adding a sweetener comprising corn syrup to form a second mixture; heating the second mixture; agitating the second mixture for a period of time sufficient to mix together the ingredients; and homogenizing the mixture, to form a liquid concentrate. Advantageously, the liquid concentrate can possess one or more of shelf-stability for at least six months; a water activity of about 0.85 or less; a pH of about 6.3 or less; a solids content from about 60 wt % to 80 wt %; and a viscosity at room temperature from about 150 cPs to 2000 cPs.

Optionally and preferably, the process may also include circulating one or more appropriate gases through the mixture, such as those fit for human consumption, for example, nitrogen, air, carbon dioxide, and the like, to improve its texture, smoothness, mouthfeel, taste, or a combination thereof.

In one embodiment, the blending also includes blending an anti-microbial preservative, a nucleating agent, or a combination thereof. In a preferred embodiment, the incorporating step includes agitation. In another preferred embodiment, the water is sufficiently hot to reduce the time for combining the ingredients. In another preferred embodiment, the mixing in and the adding both comprise continuous agitation. Preferably, the heating raises the temperature to about 170° F. to 175° F.

The present invention is further directed to a method for preparing a slush beverage including the steps of: formulating a liquid concentrate, which may be similar in composition to any of the liquid concentrates described above, or which may be made by any of the processes described above; diluting the liquid concentrate with water; and reducing the temperature of the mixture, preferably to about −10° C. to −3° C., to form the slush. Advantageously, the diluting can occur in a ratio of liquid concentrate to water of about 1:2 to 1:4, preferably about 1:3, and can preferably result in a liquid having a solids content from about 10 wt % to 30 wt %, more preferably from about 14 wt % to 20 wt %, most preferably from about 15 wt % to 17 wt %.

DETAILED DESCRIPTION OF THE PREFERRED EMBODIMENTS

The term "about," as used herein, should be understood to refer to both numbers in a range of numbers. All weight percent values herein are based on the total liquid concentrate, except as otherwise noted.

The term "substantially free," in reference to an element used herein, means having not more than 10 weight percent, preferably not more than 5 weight percent, more preferably not more than 1 weight percent, most preferably entirely free of that element.

A shelf-stable liquid concentrate, formed by the interaction of proteins, carbohydrates, and fats, and stabilized by hydrocolloids, phosphates, and/or emulsifiers, or combinations thereof, has been advantageously developed. The liquid concentrate of the present invention includes an emulsifier, a milk protein component, a freezing point depressant, a sedimentation stabilizer, a gelation stabilizer, a flavoring component, and water. Such liquid concentrates may also optionally but preferably include an ice crystal nucleating agent and/or an anti-microbial preservative. The concentrates of the present invention can advantageously avoid expensive heat treatments and do not typically require the high volumes of ready-to-drink liquids.

In accordance with the present invention, a refreshing slush beverage can be made from the liquid concentrate by dilution with water, and by substantially continuous agitation at temperatures from about −3° C. to −10° C. The slush beverages of the present invention may advantageously contain smaller ice crystals than conventional powder-made slushes and may be formed into a slush relatively rapidly when the diluted concentrate is frozen.

Milk proteins are advantageously used in the concentrate formulation to provide a smooth creamy texture and to give a pleasant dairy taste. Although any source of agglomerated or non-agglomerated milk protein may be used, preferred sources of milk proteins include low heat nonfat dry milk, medium heat nonfat dry milk, and high heat nonfat dry milk. More preferably, low heat nonfat dry milk is used as a source of milk protein, as the use of certain other milk protein sources tended to result in the formation of white lumps or sedimentation. The milk protein used in the concentrate can be from about 0.5 percent to 15 percent, preferably from about 1 percent to 10 percent, most preferably from about 2 percent to 4 percent, by weight.

For prevention or inhibition of sedimentation and/or phase separation in the concentrates, or slushes formed therefrom, various stabilizers can be incorporated. Preferred sedimentation stabilizers include kappa-, kappa(II)-, iota-, and lambda-carrageenans; carboxymethylcellulose; microcrystalline cellulose; other cellulosics; and combinations thereof. Kappa- or kappa(II)-carrageenans are preferably included. The sedimentation stabilizer component is typically present in an amount from about 0.01 weight percent to 0.05 weight percent. In particular, using kappa- or kappa (II)-carrageenans, especially at levels up to about 0.03 weight percent, may help avoid viscosity increase of the concentrate during storage.

Usually, the combination of sources of milk protein and/or kappa- or kappa(II)-carrageenans in the concentrate may lead to a gelation problem during storage for more than two months. However, it was surprisingly found that use of combinations of the kappa- or kappa(II)-carrageenans with one or more gelation stabilizers, such as gum arabic, phosphates, and polyphosphates, can help inhibit or prevent age gelation, which is of very high importance for this type of product. When gum arabic is used, it can be incorporated at levels from about 0.1 percent to 1 percent, preferably from about 0.2 percent to 0.5 percent, more preferably from about 0.25 percent to 0.4 percent, by weight. Preferable concentrations of phoshates, when included, such as food-grade disodium phosphate (DSP), can be included in amounts from about 0.1 percent to 3 percent, preferably from about 0.25 percent to 0.75 percent, more preferably from about 0.4 percent to 0.6 percent, by weight. Food-grade polyphosphate, which preferably contains at least six phosphate groups, for example, such as sodium hexametaphosphate (NaHMP), may be included in amounts from about 0.1 percent to 1 percent, preferably from about 0.125 percent to 0.5 percent, more preferably from about 0.15 percent to 0.4 percent, by weight.

A freezing points depressant is used not only to depress the onset melting point, but also advantageously to lower the water activity of the concentrate and to bring sweetness and smoothness to the concentrate and/or the slush. Examples of suitable freezing point depressants include certain saccharides (sucrose, fructose, maltodextrin), oils (nut, vegetable, palm, legume, or other variety) or other carbohydrates. The freezing point depressant is also preferably substantially free of corn syrup, high fructose corn syrup, and the like, or combinations thereof, as they may, if improperly added to the concentrate, result in white lump formation. When maltodextrin is used, it can be incorporated in concentrations from about 1 percent to 15 percent, preferably from about 3 percent to 8 percent, most preferably from about 5 percent to 7 percent, by weight. Further, when coconut or palm oils are used, they may be added in amounts from about 1 percent to 8 percent, preferably from about 2 percent to 6 percent, more preferably from about 3 percent to 5 percent, by weight.

In one embodiment, the concentrate does not contain low molecular weight alcohols (although they are also freezing point depressants), for example, such as propylene glycol or glycerol, which may be incompatible with products designed for children and/or can impart undesirable flavor to the beverage. When designing a slush beverage for adult consumption only, it may be desirable to incorporate low molecular weight alcohols as freezing point depressants, provided that no undesirable flavor is imparted to the beverage.

A Sweetener, such as corn syrup, high fructose corn syrup, and the like, or combinations thereof may also be used in the concentrates of the present invention. However, in a preferred embodiment, the addition of a sweetener to the concentrate must take place after the freezing point depressant and the rest of the ingredients have been added together, although the sweeteners are also typically freezing point depressants, in order to avoid potential white lump or sediment formation. Alternately, the sweetener may be added in the same step together with the freezing point depressant, provided that the pH of the sweetener is adjusted to not less than about 5.5. The adjustment of the sweetener pH, although not a preferred embodiment, may be performed regardless of the way in which, or timing of which, the sweetener is added. Adjusting the sweetener pH can be accomplished in any way known to one of ordinary skill in the art, e.g., by addition of sodium hydroxide or potassium hydroxide to the sweetener, which can effect the taste (e.g., undesirable saltiness, in the case of NaOH) or the properties (e.g. undesirable gelation, when combined with a sedimentation stabilizer, in the case of KOH) of the concentrate or the slush beverage.

An emulsifier, such as mono- and di-glycerides, lecithin, and the like, or combinations thereof, is preferably included to help prevent and/or inhibit foam or cream formation. Preferably, mono- and di-glycerides are included. The preferred ratio between mono- and di-glycerides, when used in the present invention, ranges from about 1:0.05 to 1:0.5. It is preferred that the total concentration of emulsifier in the liquid concentrates of the present invention be sufficient to help prevent and/or inhibit sediment formation or growth, gelation, or a significant increase in viscosity, preferably from about 0.1 weight percent to 5 weight percent.

Flavoring components are included to impart a desirable flavor to the concentrate of the present invention, or the slush beverage. Any desired flavoring component may be used, provided it is not present in an amount sufficient to detrimentally alter properties of the concentrate other than the taste, e.g., gelation, sedimentation, flocculation, phase separation, viscosity, smoothness, mouthfeel, storage stability, pH, and the like. Some examples of flavoring components useful in imparting flavor to the present invention are compounds having the flavor of chocolate, coffee, mocha, french vanilla, a Butterfinger® candy bar, chai, or combinations thereof.

To help improve the mouthfeel of the frozen slushes of the present invention and to help maintain the physical properties and performance of the slushes at freezing temperatures, an approach to increase the number of ice crystallization centers is desired. Thus, insoluble salts, for example, such as calcium silicate, calcium carbonate, titanium dioxide, and combinations thereof, to name a few, can be included as ice crystal nucleating agents. When a nucleating agent is included, it is preferably calcium carbonate. Such insoluble salts exhibited little or no observable effect on the temperature of the frozen slushes, while simultaneously and advantageously decreasing the amount and size of ice crystals, as compared to control slushes without nucleating agents. Optionally but referably, the concentration range of food-grade nucleating agents used should extend from about 0.01 percent to 0.5 percent, more preferably from about 0.03 percent to 0.09 percent, most preferably from about 0.05 percent to 0.08 percent, by weight.

Optionally but preferably, an anti-microbial preservative can be included in the concentrate to facilitate the prevention and/or inhibition of microbial growth during staorage. When an anti-microbial agent is used, it is preferably a sorbate salt, for example, such as potassium sorbate, and is preferably included at levels from about 0.2 weight percent to 0.5 weight percent.

White lump formation, foaming/creaming, phase separation, and/or sedimentation can occur during formulation of liquid concentrates of the present invention during storage, especially when one or more of the following happens: high heat nonfat dry milk is used as the single source of milk protein; the corn syrup used has a pH less than about 5.5; the concentrate is not sufficiently pH equilibrated, such that a local pH is undesirable, being relatively too acidic; and the ingredients were not combined in a preferred order.

Typical viscosity values for the finished concentrates are from about 150 cPs to 2000 cPs, preferably from about 350 cPs to 800 cPs, more preferably from about 400 cPs to 600 cPs. The viscosity of concentrates containing calcium silicate or titanium dioxide can result in significant thickening upon storage. Therefore, other salts are preferred, since they are more ideally suited for pumping into an industrial slush machine. It was found, surprisingly, that the use of calcium carbonate does not tend to result in significant viscosity changes of the concentrate during or after storage.

A preferred embodiment includes the combination of milk protein (low heat nonfat dry milk), stabilizer (DSP and NaHMP), gum (carrageenan in the presence of gum arabic), emulsifier (mono- and di-glycerides), and nucleating agent (calcium carbonate). Certain preferred concentrate and/or slush compositions did not cause physical or chemical instability problems and did not change the concentrate viscosity during a six-month storage at room temperature. Therefore, a surprisingly stable concentrate (i.e., substantially free of observable foam or cream, observable phase separation, observable sedimentation, and observable viscosity changes during at least six months of storage) can incorporate milk proteins, high fructose corn syrup, flavoring agent(s), combinations of a kappa-carrageenan with one or more of gum arabic, phosphates, and polyphosphates, and a mixture of mono- and di-glycerides.

The liquid concentrate typically possesses a total solids content from about 60 percent to 80 percent, preferably from about 63 percent to 70 percent, more preferably from about 65 percent to 67 percent, by weight. The concentrate itself typically is shelf-stable for at least 6 months, has a water activity of about 0.85 or less, and possesses a pH of about 6.3 or less.

The present invention further includes a process of preparing the liquid concentrate by adding all necessary components noted herein first into water, followed by incorporating corn syrup, preferably under high speed of agitation.

The present invention further includes a method for preparing a slush beverage by formulating the liquid concentrate of the present invention, preferably by using the process for preparing the concentrate according to the invention, followed by diluting the liquid concentrate with water, preferably by adding one part concentrate to about two to four parts water, more preferably to about three parts water, and then reducing the temperature, preferably to about $-10°$ C. to $-3°$ C.

When the liquid concentrate of the present invention is combined with water, at a dilution of one part concentrate to about two to four parts water, preferably about three parts, the resulting liquid may have a solids content from about 10 percent to 30 percent, preferably from about 14 percent to 20 percent, more preferably from about 15 percent to 17 percent, by weight, and may be consumable as a liquid beverage. However, the preferred amount of dilution depends on the amount of water in the concentrate.

Stabilizers in the concentrate formulation may be used not only to prevent destabilization of liquid system, as mentioned above, at high levels of total solids, but also to facilitate control over ice crystal nucleation and/or growth. Proper control of the nucleation and/or growth of ice crystals can enhance smoothness and full body perception when the concentrate is diluted in water and frozen for making a slush drink.

At a given temperature, a relatively low crystal growth rate can cause the development of a relatively high number of crystal nuclei, resulting in a slush beverage replete with small crystals. Further, the effect of freezing temperatures on the size and number of ice crystals were evaluated. It was found that water composition of the concentrate should have an onset melting point greater than $-10°$ C., preferably from about $-10°$ C. to $0°$ C., more preferably from about $-10°$ C. to $-3°$ C. For preferred appearance, i.e., smoothness and mouthfeel, it is preferable that the formed slush be kept at a temperature of about $-10°$ C. to $0°$ C., more preferably of about $-4°$ C. to $-3°$ C., most preferably at about $-3.5°$ C., until consumption.

To improve the appearance of the slush beverage, a suitable gas, for example, such as nitrogen or air, may be circulated through the liquid concentrate of the present invention during freezing, preferably under agitation, such as in an industrial slush machine. Under the appropriate conditions, no foaming or air incorporation will occur in the slush.

Homogenization of the concentrate was accomplished in two stages, using any suitable equipment available to one of ordinary skill in the art. The pressure imposed during the first stage of homogenization is preferably from about 500 psi to 5000 psi, more preferably from about 1000 psi to 4000 psi, most preferably from about 1500 psi to 2000 psi. The pressure imposed during the second stage of homogenization is preferably about 500 psi. The homogenization pressure for both stages can be expressed together, for example, as 1500/500 psi, in the case where 1500 psi is the pressure imposed during the first stage of homogenization and 500 psi is the pressure imposed during the second stage of homogenization.

After the homogenization process, the product is rapidly cooled. The cooling rate for this rapid cooling is preferably from about 50° F. per minute to 150° F. per minute, more preferably from about 75° F. per minute to 125° F. per minute, most preferably at about 100° F. per minute. Rapid cooling was effected until the temperature of the product was preferably at least about 80° F. or less, more preferably about 72° F., although occasionally the rapid cooling reduced the temperature as low as about 40° F.

The present invention offers several improvements and advantages, some of which are detailed below:

A physically and chemically stable concentrate may be formed, without observable phase separation or precipitation under refrigeration (40° F.), at room (72° F.), and at high (100° F.) temperatures.

The product can be shelf-stable, for at least 6 months.

The product may maintain substantially constant viscosity during storage at ambient temperatures.

The product can be easily dispersed in water.

The product is compatible with cocoa, coffee, and other flavors.

Slushes can possess a smooth texture, having good mouthfeel, with no undesirable taste after lengthy storage time.

Slushes may be freeze/thaw resistant, for example, in response to day/night modules in some slush machines.

EXAMPLES

The preferred embodiments of the present invention will be illustrated by reference to the following examples, which are included to exemplify, but not limit, the scope of the present invention.

Example 1

Liquid Concentrate Prepared with an Undesirable Order of Ingredient Addition

Disodium phosphate (130 g), sodium hexametaphosphate (37 g), gum arabic (60 g), kappa-carrageenan (7.5 g) and potassium sorbate (52 g) were blended together. The dry blend was added into 5.3 kg of hot water under agitation. Then 13.3 kg of corn syrup was added. After 5 to 10 minutes of mixing, maltodextrin (1.5 kg), coconut oil (0.9 kg), mono- and di-glycerides (75 g), nonfat dry milk (1.6 kg), cocoa (0.9 kg), coffee (0.7 kg) were added under continuous agitation. The temperature was brought to a temperature from about 170° F. to 175° F., and the solution was agitated for about an additional 21 minutes, followed by the addition of 80 g of mocha flavor. The mix was homogenized at 1500/500 psi, rapidly cooled through a plate heat exchanger and filled into glass or plastic jars, jugs, or pouches.

The product was stored at ambient temperature. No creaminess or phase separations were observed during or after storage for six months. However, white sedimented lumps were formed in the concentrate. Analogous results were found for concentrates with flavorings other than mocha flavor, otherwise using the above noted ingredients and amounts thereof.

Example 2
Liquid Concentrate Prepared According to the Invention, with a Desirable Order of Ingredient Addition Disodium phosphate (130 g), sodium hexametaphosphate (37 g), gum arabic (60 g), kappa-carrageenan (7.5 g) and potassium sorbate (52 g) were blended together. The dry blend was added into 5.3 kg of hot water under agitation. After 5 to 10 minutes of mixing, maltodextrin (1.5 kg), coconut oil (0.9 kg), mono- and di-glycerides (75 g), nonfat dry milk (1.6 kg), cocoa (0.9 kg), coffee (0.7 kg) were added under continuous agitation. Then 13.3 kg of corn syrup was added under continuous agitation. The temperature was brought to a temperature from about 170° F. to 175° F., and the solution was agitated for about an additional 21 minutes, followed by the addition of 80 g of mocha flavor. The mix was homogenized at 1500/500 psi, rapidly cooled through a plate heat exchanger and filled into glass or plastic jars, jugs, or pouches.

The product was stored during 6 months at ambient temperature. No creaminess, phase separation, sedimentation, or viscosity changes were observed during or after storage. Analogous results were found for concentrates with flavorings other than mocha flavor, otherwise using the above noted ingredients and amounts thereof.

Example 3
Liquid Concentrate Prepared to Show the Effect of Low Agitation

Disodium phosphate (130 g), sodium hexametaphosphate (37 g), gum arabic (60 g), kappa-carrageenan (7.5 g) and potassium sorbate (52 g) were blended together. The dry blend was added into 5.3 kg of hot water under agitation. After 5 to 10 minutes of mixing, maltodextrin (1.5 kg), coconut oil (0.9 kg), mono- and di-glyceride (75 g), nonfat dry milk (1.6 kg), cocoa (0.9 kg), coffee (0.7 kg) were added under continuous agitation. Then 13.3 kg of corn syrup was added under low agitation (less than 200 rpm). The temperature was brought to a temperature from about 170° F. to 175° F., and the solution was agitated for about an additional 21 minutes, followed by the addition of 80 g of mocha flavor. The mix was homogenized at 1500/500 psi, rapidly cooled through a plate heat exchanger and filled into glass or plastic jars, jugs, or pouches.

The product was stored at ambient temperature. No creaminess or phase separations were observed during or after storage. However, white sedimented lumps were formed in the concentrate. Analogous results were found for concentrates with flavorings other than mocha flavor, otherwise using the above noted ingredients and amounts thereof.

Example 4
Liquid Concentration of the Invention Prepared with a Nucleating Agent and High Agitation Disodium phosphate (130 g), sodium hexametaphosphate (37 g), gum arabic (60 g), kappa-carrageenan (7.5 g), calcium carbonate (20 g) and potassium sorbate (52 g) were blended together. The dry blend was added into 5.3 kg of hot water under agitation. After 5–10 minutes of mixing, maltodextrin (1.5 kg), coconut oil (0.9 kg), mono- and di-glyceride (75 g), nonfat dry milk (1.6 kg), cocoa (0.9 kg), coffee (0.7 kg) were added under continuous agitation. Then 13.3 kg of corn syrup was added under high agitation (greater than 600 rpm). The temperature was brought to a temperature from about 170° F. to 175° F. and the solution was agitated for about an additional 21 minutes, followed by adding 80 g of mocha flavor. The mix was homogenized at 1500/500 psi, rapidly cooled through a plate heat exchanger and filled into glass or plastic jars, jugs or pouches.

Product was stored during 6 months at ambient temperature. No creaminess, phase separation, sedimentation, or viscosity changes were observed during the storage. Mouthfeel of slushes was judged by 12 non-trained panelists, who found the product significantly improved as compared to the reference slushes prepared without calcium carbonate. Analogous results were found for concentrates with flavorings other than mocha flavor, otherwise using the above noted ingredients and amounts thereof.

Example 5
Comparison of Liquid Concentrates of the Invention Prepared with and without a Nucleating Agent The taste of these frozen slushes of the present invention were judged by 6 non-trained panelists. The slush containing calcium carbonate was found to have better smoothness as compared to a similar control as in Example 4, which had all the same ingredients and amounts thereof, except for this salt.

Example 6
Liquid Concentration Prepared to Show the Effect of High pH

Disodium phosphate (130 g), sodium hexametaphosphate (37 g), gum arabic (60 g), kappa-carrageenan (7.5 g) and potassium sorbate (52 g) were blended together. The dry blend was added into 5.3 kg of hot water under agitation. After 5 to 10 minutes of mixing, maltodextrin (1.5 kg), coconut oil (0.9 kg), mono- and di-glycerides (75 g), nonfat dry milk (1.6 kg), cocoa (0.9 kg), coffee (0.7 kg) were added under continuous agitation. Then 13.3 kg of corn syrup was added under low agitation (less than 200 rpm). The temperature was brought to a temperature from about 170° F. to 175° F., and the solution was agitated for about an additional 21 minutes, followed by the addition of 80 g of mocha flavor. The mix was homogenized at 1500/500 psi, rapidly cooled through a plate heat exchanger and filled into glass or plastic jars, jugs or pouches.

The product was stored for 6 months at ambient temperature. No creaminess, phase separation, sedimentation, or viscosity changes were observed during or after storage. However, the concentrate was not acceptable because of microbial stability due to the high pH (6.6). Analogous results were found for concentrates with flavorings other than mocha flavor, otherwise using the above noted ingredients and amounts thereof.

Example 7
Effect of Adding Bubbled Gases to the Liquid Concentrate of the Invention A liquid concentrate was prepared as in Example 4. A frozen slush was prepared in a model CDS-2 industrial machine, available from Bunn Co. of Springfield, Ill., under nitrogen or air circulation through the liquid during agitation at about −3.5° C. Mouthfeel of slushes was judged by 8 non-trained panelists. Six of them preferred the frozen slushes made using gas circulation, due to smoother slush texture as compared to the control slush, i.e., that of Example 4, without gas bubbling. Further, the amount of ice formed was not significantly altered during the freezing, when the developed concentrate was used for preparing slush with circulated gas. Analogous results were found for concentrates with flavorings other than mocha flavor, otherwise using the above noted ingredients and amounts thereof.

Example 8
Effect of Liquid Concentrate Storage at Refrigeration, Room, and High Temperatures Mocha and French Vanilla flavored concentrates were stored during 6 months at refrigeration, room, and high temperatures (about 40° F., about 72° F., and about 100° F., respectively). Each product was found to be stable (no substantially observable creaminess, phase separation, or sedimentation) and to have maintained viscosity during and after storage.

Mouthfeel of slushes prepared from the concentrates was judged every month by 12 non-trained panelists. A pleasant taste was exhibited for both flavors after each month of storage. Further, the taste was acceptable for slushes prepared according to the invention from concentrates stored at various temperatures.

Example 9
Comparison of Slush Beverages Prepared from Non-Concentrates, Concentrates without Added Nucleating Agents, and Concentrates with Added Nucleating Agents The slush beverage of the present invention, with no added nucleating agents, exhibited approximately a two-fold to three-fold reduction in the average size of ice crystals, as compared with slush beverages made from powder mixtures or nonconcentrates. Additionally, slush beverages of the present invention, which had nucleating agents present in quantities previously described, exhibited a further reduction of approximately 25% to 50% in the average size of ice crystals, in comparison to slush beverages of the present invention made without any added nucleating agents.

Although the present invention is described with reference to certain preferred embodiments, it is apparent that modification and variations thereof may be made by those skilled in the art without departing from the scope of this invention as defined by the appended claims.

What is claimed is:

1. A liquid concentrate composition comprising:
   a source of milk protein, present in an amount from about 0.5 wt % to 15 wt %;
   a sedimentation stabilizer present in an amount sufficient to help prevent or inhibit sediment formation or growth without causing gelation in the concentrate;
   a gelation stabilizer present in an amount sufficient to help prevent or inhibit gelation or a significant viscosity increase in the concentrate;
   a freezing point depressant present in an amount sufficient to reduce the freezing point of the concentrate not less than about 1° C.;
   a sweetener comprising corn syrup and present in an amount sufficient to impart a desirable taste or texture to the concentrate;
   an emulsifier present in an amount sufficient to help prevent or inhibit sediment formation or growth, gelation, or a significant viscosity increase in the concentrate;
   a flavoring component in an amount sufficient to impart a desirable flavor to the concentrate; and
   water, in an amount sufficient to form a liquid concentrate.

2. The liquid concentrate of claim 1, wherein:
   the sedimentation stabilizer is present in an amount from about 0.01 wt % to 0.05 wt %;
   the gelation stabilizer is present in an amount from about 0.1 wt % to 5 wt %;
   the freezing point depressant is present in an amount from about 0.1 wt % to 23 wt %;
   the sweetener is corn syrup and is present in an amount from about 40 wt % to 60 wt %;
   the emulsifier is present in an amount from about 0.1 wt % to 5 wt %; and
   the flavoring component is present in an amount from about 2 wt % to 16 wt %.

3. The liquid concentrate of claim 1, wherein the concentrate is shelf-stable for at least six months, has a water activity of about 0.85 or less, has a pH of about 6.3 or less, has a solids content from about 60 wt % to 80 wt %, or has a viscosity at room temperature from about 150 cPs to 2000 cPs.

4. The liquid concentrate of claim 1, wherein the sedimentation stabilizer comprises kappa-carrageenans, kappa(II)-carrageenans, lambda-carrageenans, iota-carrageenans, carboxylmethylcellulose, microcrystalline cellulose, other cellulosics, or combinations thereof.

5. The liquid concentrate of claim 4, wherein the sedimentation stabilizer has a carrageenan component which comprises kappa-carrageenan, kappa(II)-carrageenan, of a combination thereof, present in an amount from about 0.01 wt % up to 0.03 wt %.

6. The liquid concentrate of claim 1, wherein the gelation stabilizer comprises gum arabic, food-grade phosphates, food-grade polyphosphates, or combinations thereof.

7. The liquid concentrate of claim 6, wherein the gelation stabilizer comprises disodium phosphate, which is present in an amount from about 0.1 wt % to about 3 wt %.

8. The liquid concentrate of claim 1, wherein the emulsifier comprises monoglycerides, diglycerides, lecithin, or combinations thereof.

9. The liquid concentrate of claim 8, wherein the emulsifier comprises a mixture of mono- and di-glycerides, present in a ratio from about 1:0.05 to 1:0.5.

10. The liquid concentrate of claim 1, wherein the freezing point depressant comprises carbohydrates, sucrose, fructose, maltodextrin, oils, or combinations thereof and is present in an amount of no more than about 23 wt %.

11. The liquid concentrate of claim 1, wherein the flavoring component comprises compounds having the flavor of chocolate, coffee, mocha, french vanilla, peanut butter, chai, or combinations thereof.

12. The liquid concentrate of claim 1, which further comprises at least one nucleating agent comprising calcium carbonate and being present in an amount sufficient to decrease ice crystal size by at least 10% by volume.

13. The liquid concentrate of claim 1, which further comprises at least one anti-microbial preservative present in an amount sufficient to prevent or significantly inhibit microbial stability or growth.

14. A process for preparing a liquid concentrate comprising:
   blending together powder components comprising a gelation stabilizer and a sedimentation stabilizer to form a first mixture;
   combining water and the first mixture;
   mixing in a source of milk protein, an emulsifier, a flavoring component, and a freezing point depressant;
   adding a sweetener comprising corn syrup to form a second mixture;
   heating the second mixture;
   agitating the second mixture for a period of time sufficient to mix together the ingredients; and homogenizing the second mixture, to form a liquid concentrate.

15. The process of claim 14, which further comprises circulating a gas through the mixture to improve its texture, smoothness, mouthfeel, taste, or a combination thereof.

16. The process of claim 14, wherein the blending further comprises blending an anti-microbial preservative, a nucleating agent, or combinations thereof.

17. The process of claim 14, wherein the combining comprises agitation and wherein the water is sufficiently hot to reduce the time for combining the ingredients.

18. The process of claim 14, wherein the mixing and the adding each comprise substantially continuous agitation and the liquid concentrate that is formed has a viscosity of about 150 cPs to 2000 cPs.

19. The process of claim 14, wherein the heating raises the temperature of the second mixture to about 170° F. to 175° F.

20. A method for preparing a slush beverage comprising:
providing the liquid concentrate of claim 1;
diluting the liquid concentrate with water to form a mixture; and
reducing the temperature of the mixture to about −10° C. to −3° C., to form the slush.

21. The method of claim 20, wherein the diluting occurs in a ratio of liquid concentrate to water of about 1:2 to 1:4.

22. The method of claim 20, wherein the diluting results in a liquid having a solids content from about 10 wt % to 30 wt %.

23. A method for preparing a slush beverage comprising:
preparing a liquid concentrate according to the process of claim 14;
diluting the liquid concentrate with water to form a mixture; and
reducing the temperature of the mixture to about −10° C. to −3° C., to form the slush.

24. The method of claim 23, wherein the diluting occurs in a ratio of liquid concentrate to water of about 1:2 to 1:4.

25. The method of claim 23, wherein the diluting results in a liquid having a solids content from about 10 wt % to 30 wt %.

* * * * *